UNITED STATES PATENT OFFICE.

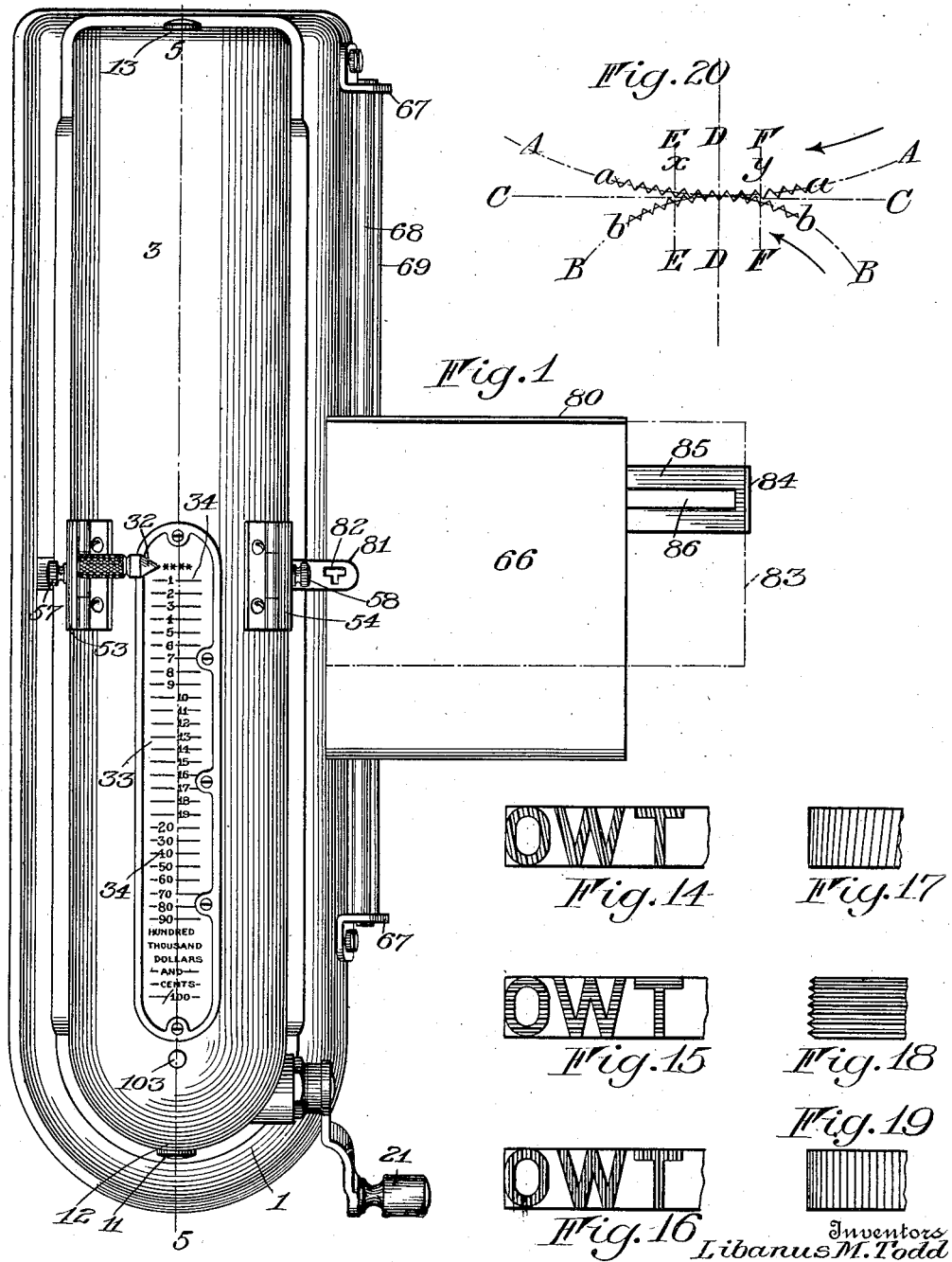

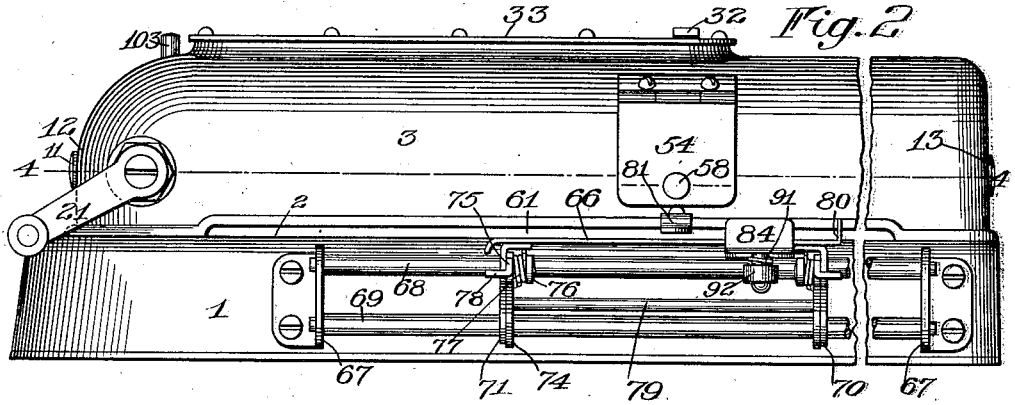
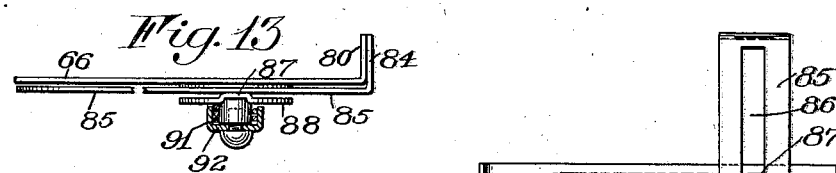
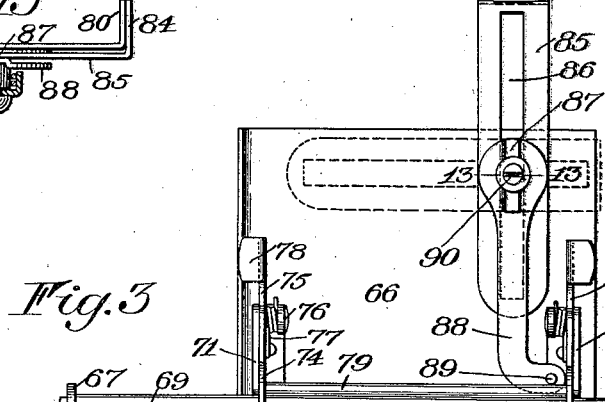
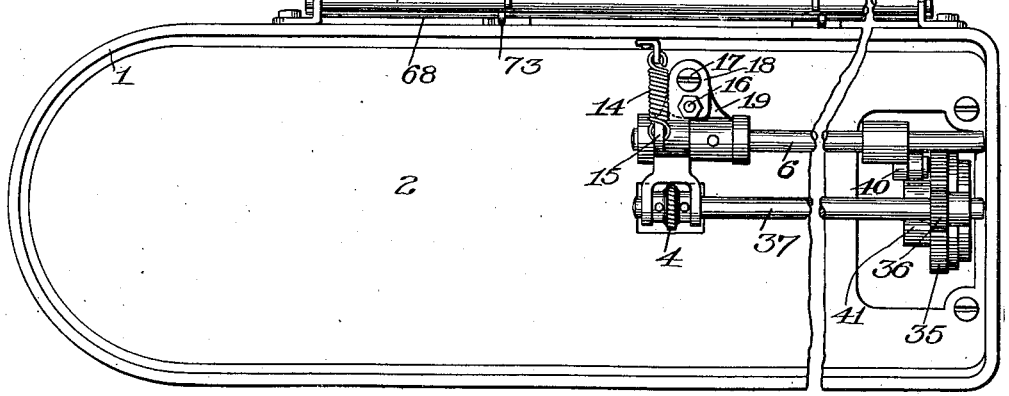

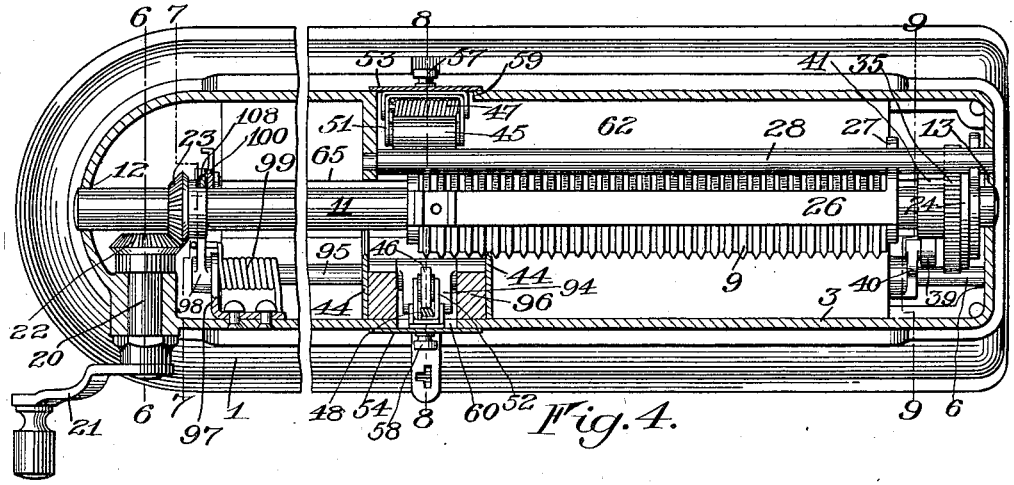

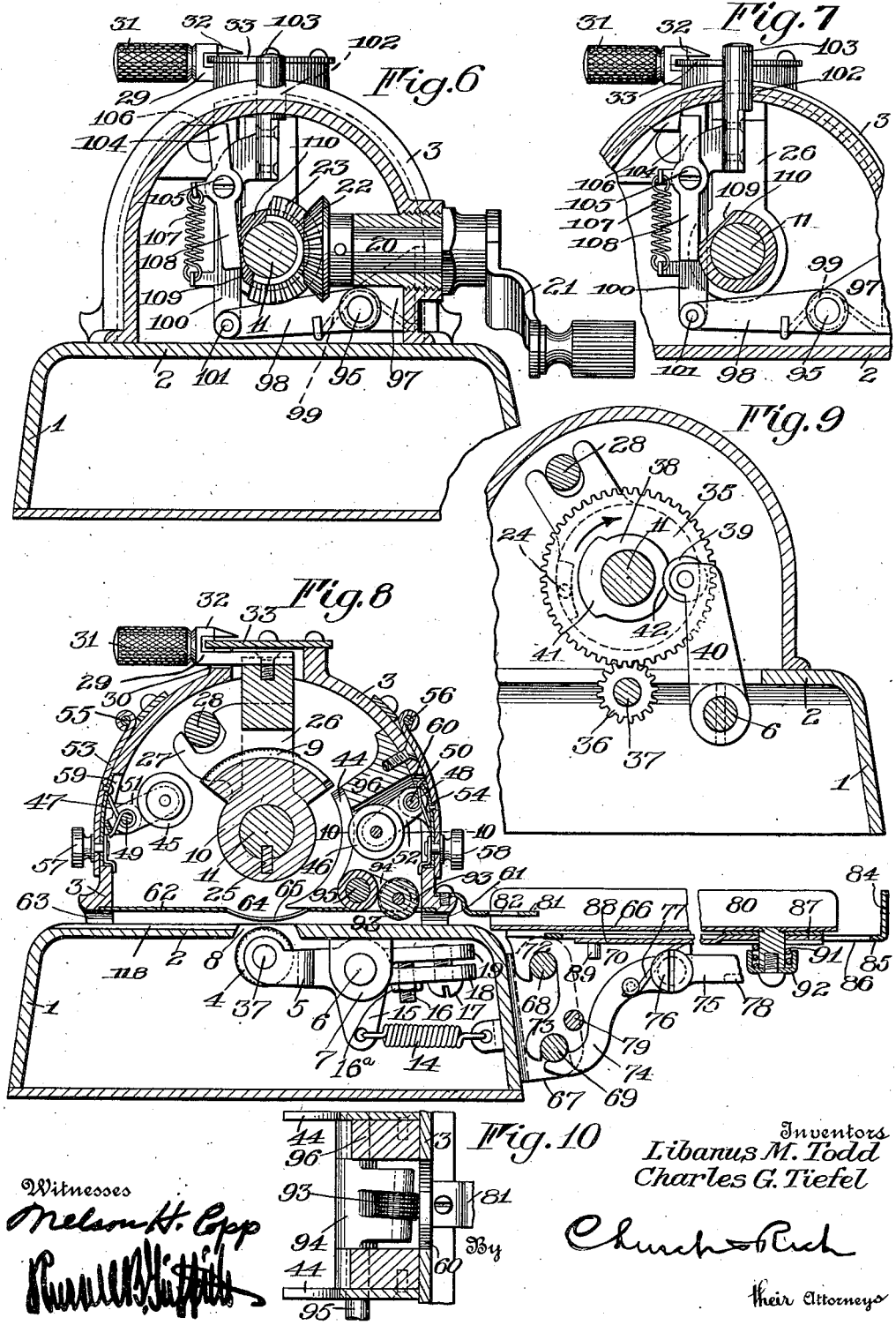

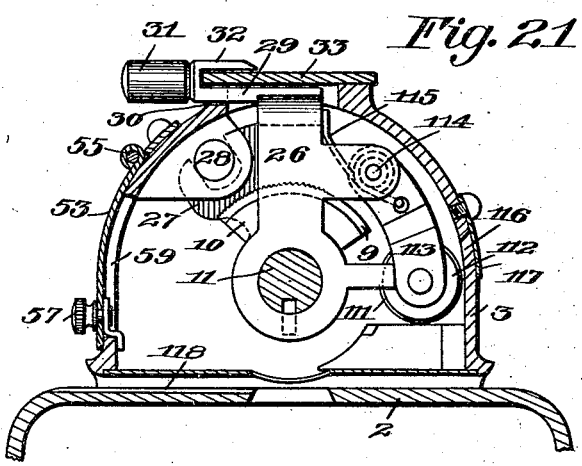

LIBANUS M. TODD AND CHARLES G. TIEFEL, OF ROCHESTER, NEW YORK, ASSIGNORS TO G. W. TODD & COMPANY, A FIRM COMPOSED OF GEORGE W. TODD AND LIBANUS M. TODD, DOING BUSINESS AT ROCHESTER, NEW YORK.

CHECK-WRITER.

1,138,330.　　　　Specification of Letters Patent.　　Patented May 4, 1915.

Application filed March 10, 1913. Serial No. 753,396.

*To all whom it may concern:*

Be it known that we, LIBANUS M. TODD and CHARLES G. TIEFEL, of Rochester, in the county of Monroe and State of New York, have invented certain new and useful Improvements in Check-Writers; and we do hereby declare the following to be a full, clear, and exact description of the same, reference being had to the accompanying drawings, forming a part of this specification, and to the reference numerals marked thereon.

Our invention relates to machines for printing on checks and similar negotiable instruments limiting value to prevent them from being "raised" or so altered as to change the face value and make them appear payable for larger amounts than were originally intended to be conveyed, and it has for its object to provide a device of this character by means of which a relatively wide range of fractional or other amounts are available to the operator so that the exact amount of the check may be written in, indelibly, by means of the machine, as well as the limiting maximum amounts that are sometimes applied in addition to the regular inscription.

More specifically stated, the invention is directed in part to a particular relative arrangement of the elements of the printing couple themselves; toward providing means for guiding and advancing the check during the printing operation and toward other features of both general and detail construction as will hereinafter appear. To these and other ends the invention consists in certain improvements and combinations of parts all as will be hereinafter more fully described, the novel features being pointed out in the claims at the end of the specification.

In the drawings: Figure 1 is a top plan view of a check writing machine constructed in accordance with and illustrating one embodiment of our invention; Fig. 2 is an elevation thereof taken from the feeding and delivery side of the machine; Fig. 3 is a bottom plan view with the bottom of the casing removed to reveal interior parts; Fig. 4 is a horizontal section taken substantially on the line 4—4 of Fig. 2; Fig. 5 is a longitudinal vertical section taken substantially on the line 5—5 of Fig. 1; Fig. 6 is a transverse vertical section taken substantially on the line 6—6 of Fig. 4; Fig. 7 is a fragmentary section taken on the line 7—7 of Fig. 4, and showing the parts of Fig. 6 in different positions; Fig. 8 is a transverse vertical section taken substantially on the line 8—8 of Fig. 4; Fig. 9 is a vertical transverse section taken substantially on the line 9—9 of Fig. 4; Fig. 10 is a detail section taken substantially on the line 10—10 of Fig. 8; Fig. 11 is a detail transverse vertical section corresponding to Fig. 8 but showing a modified form of platen; Fig. 12 is a vertical section taken substantially on the line 12—12 of Fig. 11, but showing most of the parts of that figure in elevation; Fig. 13 is a detail section taken substantially on the line 13—13 of Fig. 3; Figs. 14, 15 and 16 are enlarged plan views of different forms of type faces; Figs. 17, 18 and 19 are plan views of the corresponding platen surfaces with which the type faces of Figs. 14, 15 and 16 are respectively adapted to coöperate; Fig. 20 is a diagrammatic view illustrating the theory of operation of a particular form of printing couple utilized in the practice of the invention; Fig. 21 is a sectional view corresponding in part to Fig. 8 but showing another form of inking mechanism; Fig. 22 is a side elevation of the inking roll shown in Fig. 21; Fig. 23 is a plan view much enlarged of a portion of the printed check, and Fig. 24 is a section on the line 24—24 of Fig. 23.

Similar reference numerals throughout the several figures indicate the same parts.

In the present embodiment of the invention, there is employed a relatively fixed platen and a shiftable type carrier having a plurality of forms thereon that are selectively moved, one at a time, into coöperation with the platen. To these ends, a lower casing 1 (Figs. 5 and 3) has a top wall 2 constituting the printing bed or runway table, and supported on this top wall or table and secured thereto is an elongated upper casing 3. The platen is constituted by a wheel 4 located in the lower casing 1 and supported on an arm 5 fixed to a rock shaft 6 that is journaled in bracket bearings 7. The said platen is adapted to move through an opening 8 in the bed 2 to coöperate with the check placed thereon and also to coöperate with the type faces of a plurality of circumferentially arranged, but longitudinally spaced printing forms 9 on a rotary type carrier or cylinder 10, carried on a shaft 11 journaled in the upper casing 3 at 12 and 13. The platen 4, however, is normally held in a retracted or inoperative position by a spring 14 connected to the casing 1 and to an arm 15 forming, with the arm 5 before mentioned, a bell crank lever fixed to the shaft 6. Opposing screw adjustments 16 and 17 between an extension 18 of the arm 5 and another relatively fixed arm 19 provide for a nice adjustment of the throw of the platen 4 to accurately regulate its coöperative engagement with the type faces. The screw 16 is threaded through the arm 18 to thrust against the arm 19, thus tending to separate these arms, said screw being fitted with a lock nut 16ª while screw 17 is threaded into arm 19 and passes fully through arm 18 with its head bearing against the under side thereof so that the tendency of this screw is to draw the arms together. By working these screws against each other a very fine and stable adjustment may be obtained in a well known manner.

The printing shaft 11 is driven, in the present instance, by a crank shaft 20 journaled in the upper casing 3 (Figs. 4 and 6) and provided with an exteriorly arranged crank 21 for manual operation. A bevel gear 22 on the shaft 20 meshes with a bevel gear 23 fixed to the shaft 11, but a suitable clutch at the other end of the latter, such as the ball clutch indicated at 24 in Figs. 4 and 9, is preferably employed to allow the shaft 11 to rotate in only one direction.

The type carrier or printing cylinder 10 is locked to rotate with the shaft 11 by a feather 25, but is free to slide back and forth longitudinally thereof. This shifting movement is effected, in the present instance, by a yoke 26 (Figs. 4, 5 and 8) which is also slidable longitudinally of the shaft but in which the latter is free to turn, the yoke itself being held against rotation by a fork 27 slidably engaging a guide rod 28 disposed longitudinally of the casing 3 in parallelism to the shaft.

An arm 29 extending from the yoke 26 passes through a lateral slot 30 in the casing 3 and terminates in an operating knob or handle 31, adjacent to which handle is an indicator 32 that coöperates with an index plate 33 forming, if preferred, one wall of the slot 30 and bearing characters 34 each corresponding to or indicative of a particular type form 9 on the type cylinder 10. These characters are so arranged relatively to the row of forms that when the indicator 32 points to a given character, the corresponding form will be in alinement with the platen 4 and in position for exclusive coöperation therewith.

Located in the present instance at the right hand end of the shaft 11, and fixed thereon is a gear 35 (Fig. 9) that meshes with the gear 36 on the far end of a shaft 37 to which the platen 4 is fixed so that the latter is positively driven with relation to the type cylinder. The shaft 11 also carries at this point a cam 38 with the surface of which coöperates a roller 39 on an arm 40 fixed to the rock shaft 6 that carries the bell crank lever 5.

In the making of a printing impression, therefore, as the type cylinder 10 is rotated to the right in Fig. 8 from the normal position shown, the roller 39 of the arm 40 rides on the low part of the cam 38 and the platen 4 remains depressed until the segmental form 9 reaches its vicinity, whereupon the said roller 39 engages the high point 41 of said cam and deflects the arm 40, rocking the shaft 6 and carrying the platen upwardly through the opening 8 into coöperative relationship with the type form and is held there until the end of the type form is reached, at which point the roller 39 leaves the high part 41 of the cam and the platen is retracted again by its spring. The arm 40 and its roller 39 is also utilized as a centering device for holding the type cylinder 10 in normal position with its type forms raised, as shown in Fig. 8, by providing the cam 38 with a depression 42 into which the roller 39 drops when the forms are in this position. The resistance or sound of this movement notifies the operator that the normal or starting position has been reached.

The opposite end of the shaft 37 on which the platen 4 is mounted is journaled in the lower casing 1 at 43, as shown in Fig. 5, but its bearing is such as to permit the slight tilting movement required for the spring 14 to carry the platen into retracted position.

The advancing ends of the segmental type forms 9 may be tapered or brought to a point, as clearly shown in Figs. 4 and 5, so that two or more guiding blades 44 projecting from the casing 3 may engage and travel between adjacent forms to center the form selected for the impression, accurately, with respect to the platen 4 in case the operator has been careless in bringing the indicator 32 to position. With the arrangement of the present device, one of these blades is sure to engage, no matter how extreme the position of the type cylinder may be with reference to the length of the shaft and casing, as for instance, when a form at either of the extreme ends of the cylinder is being used, while with the intermediate forms, both of the blades are engaged in the majority of instances.

The inking devices for the type cylinder 10 may be of any desired or appropriate nature, so far as most of the accompanying features of the machine are concerned. In Figs. 4 to 8, they comprise absorbent rolls 45 and 46 at diametrically opposite points with relation to the type cylinder 10 and normally held yieldingly in the path of the forms 9 thereon by springs 47 and 48 mounted upon the pivots 49 and 50 of yokes 51 and 52 by which the rolls are held, the said springs acting against the yokes and a stationary part at their respective ends. Both inking devices may be carried upon doors 53 and 54 hinged at 55 and 56, respectively, and raising vertically when released from knob latches 57 and 58 so that the inking rolls will be swung outwardly through openings 59 and 60 at the opposite sides of the upper casing 3, for re-inking or other purposes. In the present instance, the left hand roll 45 is longer than the roll 46 so that it is capable of inking a number of the forms upon the rotation of the type cylinder, but as the roll 46 coöperates only as the forms move downwardly into coöperation with the platen to make the impression, it can be narrow enough to ink only the one form. We at present prefer, however, to use an inking mechanism such as that shown in Figs. 21 and 22 that comprises but a single inking roll 112 extending longitudinally of the type cylinder 10 and coincident therewith in length. It is carried by the yoke 26 that shifts the cylinder 10 so that it has a fixed relationship with the latter at all times being journaled in arms 113, pivoted at 114 to the yoke and acted upon by springs 115 which normally hold the roll yieldingly in the path of the type forms 9 in a position and manner much the same as that of the inking roll 46 previously described. Thus all of the forms are inked with certainty during each revolution and printing operation of the type cylinder just prior to the impression of that particular form which coöperates with the platen. With this construction, a small opening 116 is formed in the casing 3 in the vicinity of the printing point, namely, in alinement with the platen 4, said opening being covered by a door 117 and through it the nozzle of an ordinary oil can or other device may be inserted to apply ink to the roll as needed. In this connection, it will be noted that inasmuch as a given form on the type cylinder 10 always coöperates with the same circumferential line on the inking roll, and this line is brought opposite the opening 116 whenever that particular form is brought to printing position, it is easy to locate and apply ink to that portion of the roll upon which it is needed. In other words, some of the forms being used more frequently than others with a consequent localized diminution in the supply of ink on the contacting portion of the roll 112, it is only necessary when that form begins to make a faint impression to move the indicator 32 to the corresponding character on the index plate 33 and to then apply ink through the opening 116 as it is assured that the relatively dry portions of the roll will then be in position to receive the application. If desired, the absorbent covering of the inking roll 112 may be divided by suitable division plates 111 of material impervious to the ink such as thin metal disks forming, in effect, a plurality of alined rolls, each of which may contain ink of a different color from that adjoining. By this means, certain selected forms or groups of forms may be caused to print in one color, and others in another.

With this last described inking mechanism, the opening 59 closed by the door 53 and which also pierces the casing at the printing point may be utilized as a means for cleaning type on the printing cylinder in which instance the indicator 32 is again used to bring such individual form as may have shown evidences of being clogged to a position in which it is accessible for cleaning through the opening 59.

The checks are fed in from the right hand side of the machine through an elongated opening 61 beneath the guard plate 62 and there is a corresponding opening 63 at the opposite side of the casing 3 to permit the check to project therefrom when required. The guard plate 62 is spaced a suitable distance from the bed 2, but has a depressed portion 64 provided with a slot 65 at the point of contact of the platen 4 and the form 9. The thickness of the plate in the region of this slot is very little and may approximate the tangent at the point of contact so that all portions of the check are protected, with the exception of the narrow strip of its surface upon which the imprint is made and adjacent forms cannot, therefore, contact with it.

This guard plate 62, however, is preferably made to serve another function. By forming the slot 65 therein so that the platen 4 fits it very closely and by so locating the depressed portion 64 that the platen projects above it slightly when in coöperation with the printing cylinder, the check in passing through the machine has raised or embossed upon its surface a rib 118 (Figs. 23 and 24) which rib is constituted by the narrow strip of surface bearing the printed characters. This results from the fact that such narrow strip is carried up through the slot to the printing contact by the platen 4 whereas the guard plate 62, or rather the depressed portion 64 thereof in which the slot 65 is formed, fits so closely about the platen that adjacent portions of the paper are pressed back. It will be noted that this operation occurs during the impression interval and constitutes a simple embossing means incorporated, virtually, in the printing mechanism itself.

An advantage of this embossed impression resides in the fact that it makes the check that much harder to raise, as, for instance, with relation to the method sometimes adopted of cutting out a portion of the paper containing that character for which substitution is designed and inlaying a similar fitted piece bearing the new character. Another advantage is that, with a perforate impression particularly which latter leaves a rough or interrupted surface on the under side of the paper, this surface is held out of contact while the check is being manipulated or shoved about and in addition to this its spaced relationship to the printing bed prevents such ink as may have been forced through the paper during the making of the impression from smearing by contact with the bed. Another way of preventing this smearing is to provide a narrow, elongated channel groove or depression 118 in the bed 2 as shown in the drawings. This depression is, of course, in alinement with the platen 4 at the printing point and leads to the delivery side of the machine so that the printed strip of the check is free from contact during its passage out.

It will be noted that the length of the machine and of the entrance slot 61 permits a wide range in the dimensions of the sheet to be acted upon, which is of particular advantage when it is desired to print crosswise of an ordinary check blank or voucher form. This provision is, therefore, made notwithstanding the fact that the machine possesses the further advantage of an arrangement whereby the impression is always made at the same relative point, namely, on the line of the relatively fixed platen 4. In other words, the printing cylinder is shifted endwise to bring the particular type form selected to the vicinity of the platen and check rather than carrying the latter to the position of the particular type form with reference to the length of the cylinder.

We prefer to provide, in addition to the main printing bed 2, an extension bed or table 66 upon which the work is supported and arranged preliminarily to passing it through the machine, which extension bed is preferably made detachable and adjustable. To these ends, outside brackets 67 on the lower casing 1 support upper and lower guide rods 68 and 69. Brackets 70 and 71 on the under side of the plate 66, connected by a brace rod 79, are provided with upper and lower hooks or open slots 72 and 73 that detachably engage over the rods 68 and 67, respectively, to support the bed plate while locking jaws 74, formed by levers 75, pivoted at 76, engage the lower rod 69 in opposition to the hooks 73 to constitute clamps that normally hold the extension bed against disengagement under the influence of springs 77. These clamps may be released by pressing upwardly on finger portions 78 on the levers 75 when it is desired to remove the extension bed for shipping or other purposes.

A flange 80 at one side of the extension bed 66 acts as a guide with which one edge of the check engages as it is advanced into the machine to properly aline the printing thereon, and as the extension bed as before described is slidably adjustable on the rods 68 and 69, the gage or guide 80 is thus rendered also capable of adjustment for wide or narrow checks.

In order to predetermine the alinement of the printing, a gage finger 81 projects from the upper casing 3 just above the bed 66 and we prefer to provide this finger with a peculiarly shaped sight opening in the form of a T slot 82. The portion of this slot that extends longitudinally of the check (the position of which latter is indicated in dotted lines at 83) discloses the exact width and position of the printed line that will result, the said portion being in alinement with the platen 4, while the portion at right angles thereto will disclose the adjacency of a ruled line on the check just above which the impression should appear.

There is also provided an end gage for fixing the degree to which the check is projected into the machine to receive the first impression at the left hand end thereof and whereby the exact distance of the beginning of the writing from that end may be predetermined. This gage comprises, in the present instance, a flange 84 at the end of a bar 85 having a slot 86 therein. Fitting within this slot on the under side of the bed plate is a depressed rib 87 on a keeper plate 88 that is loosely supported at 89. A guide pin 90 extends through the said depressed portion 87 and the slot 86 and a spring 91 interposed between its head 92 and the keeper plate yieldingly hold the depressed rib in the slot so that the gage may be drawn in and out with only the frictional resistance that also serves to hold it in any position of adjustment. By forcibly turning the gage bar laterally, however, the rib is displaced from the slot against the tension of the spring 91 and may be made to assume a folded position parallel with the edge of the bed plate from which it normally projects as shown in dotted lines in Fig. 3.

The mode of operation of the machine as thus far described is suggested by the description. Referring more particularly to Fig. 1, and assuming that a check is to be written for, say, one hundred dollars and ninety cents, the indicator 32 is first moved to the numeral "1" on the scale 33, or, if it is desired, as is sometimes the case, to precede the writing with a line of asterisks or other arbitrary characters, it is moved to the position actually shown in Fig. 1, first. This operation slides the type cylinder 10 longitudinally on its shaft 11 and brings the type form corresponding to that character into position above the platen 4. The check is then placed on the extension bed 66 and the latter moved on its guide rods 68 and 69 until the opening 82 in the sight finger 81 registers over the line on which the printing is to be done. The end gage 84 is further set to bring the point at the left hand end of the check at which the printing is to commence over the center of the platen 4. The crank 21 is then rotated. As the form 9 moves around to the right in Fig. 8, the raised portion 41 of the cam on the end of its shaft 11 engages the roller on the arms 40 of the rock shaft 6 and throws the platen 4 up into coöperation therewith. The check is thus grasped between the form and platen and as the former proceeds in rolling contact with the latter, the impression is made and the check at the same time advanced to the left the distance of the printed word. After leaving the platen, the form returns to its former raised position in which it is halted by the engagement of the roller 39 on the arm 40 in the depressed portion 42 of the cam 38. The operator then moves the indicator 32 to the next character, namely, the word "hundred" bringing the corresponding form on the type cylinder 10 into position above the platen, whereupon the operation is repeated and the word "hundred" printed after the numeral "1" on the check, and so on through "dollars," "90" and "cents."

The relative alinement of the forms 9 on the type cylinder is not of great moment, inasmuch as the printing and feeding of the check does not start until the form selected actually engages the paper, the only important consideration, in the present embodiment of the invention, being that all of the forms be in inoperative position at one time to permit the shifting of the cylinder, but it is desirable that spaces be provided between the successive impressions to separate adjacent words and figures. We provide for this by forming the printing faces of the type forms 9 with ribs or serrations as shown in Figs. 14, 15 and 16 and by ribbing or serrating the contacting surface of the platen 4 in a complementary manner, as shown in Figs. 17, 18 and 19, so that the two members actually mesh in the manner of gears having very fine teeth. Thus the actual engagement of the form and platen is not limited to a single point of tangency between these parts, but is enlarged to embrace a larger proportion of their peripheries and a larger area of the check, so that the latter is still engaged and propelled a short distance after it leaves the center or crown of the platen. This will be seen upon reference to the diagrammatic view of Fig. 20 wherein the dotted segments A—A and B—B indicate the surfaces of plain rolls turning in contact and also the pitch lines of serrated rolls a—a and b—b. C—C indicates the check. D—D indicates the single point of contact of the plain rolls and check, and E—E represents the point at which the serrated rolls leave engagement with the paper, while F—F represents the point at which the next serrated printing form strikes the paper. There is thus the distance x—y that the check is fed by the members through which it passes without receiving any impression.

The above constitutes a simple but at the same time positively acting spacing means which also performs the function of perforating the material of the check within the outlines of the type in a manner that disrupts the fibers of the paper making them better fitted to absorb and retain the indelible ink used. In Figs. 14 and 17 we have shown the ridges or serrations extending transversely of the type line and at an angle; in Figs. 15 and 18, longitudinally of the type line and peripherally or circumferentially of the two rotary elements of the couple, and in Figs. 16 and 19, transversely at right angles to the type line. Of these three forms, we at present prefer the second mentioned, namely, the longitudinal or circumferential arrangement mainly because it gives clearer definition to the printed line and because no fixed rotarial relationship between the type cylinder and platen is required to obtain a proper mesh. It will be seen that the theory of operation, as illustrated in Fig. 20, applies in the same way to this longitudinal ribbing except that the feeding contact beyond the center of rotation is of a frictional rather than a positive, nature.

Aside from the control that may be exercised over the feeding or advancement of the check at the conclusion of one impression preliminarily to the taking of the next by the proportioning of the intermeshing ribs above described and explained, the movements of the platen 4 into and out of operative position have a bearing on this result. It is evident that the coöperation, intimate or approximate, of the platen and type form is necessary to keep the ribs or serrations on their faces in such positive contact with the check as to impart a progressive impulse thereto and if this coöperation is terminated abruptly by the dropping or retraction of the platen before the two parts would ordinarily leave contact with each other and with the paper as a result of their respective rotary movements alone, such impulse is correspondingly abbreviated. With the platen actuating mechanism shown in the present embodiment of the invention, this additional means of regulating the feed can be readily taken advantage of for the platen is retracted in timed relation to the movement of the type carrier as hitherto described and by simply advancing or retarding the raised portion 41 on the cam 38 (Fig. 9) the platen may be made to drop away from the check and form, also allowing the check to drop away from the form, at any desired instant with relation to the passage over the point of printing contact of the rear end of the form. In view of this consideration, therefore, it is preferable that the forms have their rear ends or terminations that leave the paper last and that comprise, usually, the last letters of words, all in alinement with each other in a direction longitudinally of the cylinder although the irregularity of the opposite or advance ends due to the varying lengths of the expressions such, for instance, as "seven" and "seventeen" is of no moment as previously stated as the printing and feeding of the check does not start until the form selected actually engages the paper.

We contemplate that this means of shortening the feeding impulse will be of value where the depth of the serrations or ridges, in order to have the perforating or fiber-disrupting capacity required for checks made out on relatively thick or heavy material, is such as to produce too wide a spacing between successive impressions in proportion to the dimensions of the type characters such as the letters of a word. As very slight additions such, for instance, as the addition of a "Y" to the word "Eight" in order to raise "Eight" to "Eighty", are required at times to make wide changes in the meanings of the expressions printed with a machine of this character, the provision of very sensitive means for accurately predetermining the spacings between characters becomes important.

Inasmuch as it is desirable that the check be held against inadvertent movement during its passage through the machine and that it be held against its guide 80 on the extension bed 66, and otherwise straightened in its movements, we provide the mechanism best shown in Figs. 4, 6, 7, 8 and 10. This mechanism comprises a presser foot embodying, in the present instance, a roller 93 journaled in a yoke 94 fixed to a shaft 95 that is journaled in the block 96 that will be seen to support the guiding blades 44 for the type forms previously described, an extension of said shaft being journaled in a bracket 97 (Fig. 4) beyond which it carries fixed thereto a lever 98 (Fig. 6). A spring 99 encircling the shaft bears at its ends against a fixed part of the casing and the lever 98, respectively, with a tendency to rotate the shaft in such direction that the presser foot roller 93 will be rocked to a position against the bed and wherein it will grip the check between itself and the latter. The said roller turns on a slightly inclined axis as shown in Fig. 10 or in a plane that converges with respect to the guide 80 on the extension bed 66, so that its tendency is to continuously urge the check over toward the guide keeping the edge of the former always against the latter. This presser foot 93 not only holds the check against inadvertent movement in a general way but is also a contributing agent in regulating the spacing feed by exerting a drag on the check as it passes through the printing couple. Even with the retracting platen, the feeding means described that provides for the spacing of the impressions, will ordinarily give too much distance of travel if the check is left absolutely free to progress. By means of the presser foot, however, the check is placed under a slight tension sufficient to nullify to the required degree its progress beyond the printing point and to prevent excessive feeding movement.

In order to insert the check, however, it is necessary that this presser foot be restrained. This is accomplished, in the present instance, by manually operable means embodying a plunger 100 pivoted to the lever 98 at its lower end at 101 and guided in the casing at 102 at its other end from which latter it projects in the form of a push button as shown at 103. Upon depressing the plunger, the shaft 95 is rocked and the presser foot roller 93 raised to the position of Fig. 8, in which position it is temporarily locked by the engagement of a detent 104, pivoted to the plunger 100 at 105, with an abutment or shoulder 106 on the casing 3, the engagement thereof being automatic under the influence of a spring 107. To insure the operation of the presser foot, however, during the impression interval, or while the printing form is in engagement with the check, automatic means are employed for tripping the detent 104 when the revolution of the type cylinder is started. An extension 108 is, therefore, provided on the detent that rests within a flattened or cutaway portion 109 on the hub 110 of the bevel gear 23 when the detent is in engagement with the abutment 106, but when the shaft 11 and the printing cylinder 10 is rotated to take an impression, the said hub 110 immediately acts in the capacity of a cam which trips the detent and allows the plunger 100 to rise under the influence of the spring 99 and hence the shaft 95 to rock the presser foot roller 93 down into engagement with the check. During the operation of the machine, therefore, the button 103 must be depressed to release the check for removal after printing and permit the introduction of the next one, but thereafter the presser foot is not required to be placed in operation by manual means as this result is accomplished automatically and but one actuation of the button 103 is therefore required to each check.

In Figs. 11 and 12, we have illustrated a modification of the platen 4 wherein it is not necessary to vibrate it toward and from a position for engagement with the check and type cylinder, thus making unnecessary the provision of the cam movement shown in Fig. 9. In this construction, that side of the roller 4 which is uppermost when the type forms are in inoperative position is flattened as shown at 111. This permits the insertion of the check beneath the depressed portion 64 of the guard plate 62 or its removal at that time, but by the time the form reaches the vicinity of the platen, the flat portion has rotated beyond the point of tangency.

We claim as our invention:

1. In a check writer, the combination with a platen, of a rotary type carrier having a plurality of transversely disposed type forms fixed thereon and relatively spaced longitudinally of the carrier, one of said members being shiftable relatively to the other in a direction longitudinally of the carrier to bring the individual forms, selectively, and the platen into coöperative positions and means for rotating the carrier while in coöperation with the platen to make the printing impression.

2. In a check writing machine, the combination with a fixed platen, of a longitudinally shiftable type carrier having a plurality of transversely disposed type forms fixed thereon and relatively spaced longitudinally of the carrier whereby the characters may be brought, selectively, into coöperative position relatively to the platen at the same point, the latter being adapted to coöperate with only one form at a time, means for rotating the carrier while in coöperation with the platen to make the printing impression and a check guide arranged to position a check passed through the machine in the direction of rotation of the carrier with a constantly uniform relationship to the platen.

3. In a check writer, the combination with a rotary type cylinder having a plurality of circumferentially disposed forms fixed thereon and spaced longitudinally of the cylinder, of a rotary platen adapted to coöperate in rolling contact with only one form at a time and means for operating one of said members relatively to the other in a direction longitudinally of the cylinder to bring the individual forms, selectively, into coöperative position relatively to the platen.

4. In a check writer, the combination with a rotary type cylinder having a plurality of circumferentially disposed and relatively fixed forms thereon spaced longitudinally of the cylinder, of a platen adapted to coöperate with only one form at a time, means for rotating the cylinder while one of its forms is in coöperation with the platen during the taking of the impression and means for operating the cylinder back and forth longitudinally of its axis to bring the individual forms thereon, selectively, into coöperative position relatively to the platen.

5. In a check writer, the combination with a casing having a slot therein, of a platen within the casing, a shaft, a type carrier mounted thereon and having a plurality of type forms spaced from each other longitudinally of the carrier, the said carrier cylinder being shiftable longitudinally on the shaft to bring the individual type forms, selectively, into coöperative relationship with the platen, and an operating arm for so shifting the carrier extending through the slot in the casing and accessible from the exterior of the latter.

6. In a check writer, the combination with a casing having a slot therein, of a platen within the casing, a shaft, a type carrier mounted thereon and having a plurality of type forms spaced from each other longitudinally of the carrier, the said carrier being shiftable longitudinally on the shaft, to bring the individual type forms, selectively, into coöperative relationship with the platen, an operating arm for so shifting the carrier extending through the slot in the casing, an index plate on the exterior of the casing extending longitudinally of the shaft and bearing markings corresponding to the type forms on the type carrier and an indicator movable with the operating arm and coöperating with the index plate.

7. In a check writer, the combination with a relatively fixed platen, of a shaft, a type cylinder mounted thereon and having a plurality of type forms disposed circumferentially thereof and spaced from each other longitudinally of the cylinder, the said cylinder being rotatable with the shaft but slidable freely longitudinally thereof to bring the individual type forms, selectively, into coöperative position relatively to the platen, and a yoke slidably mounted on the shaft but locked against rotation therewith, said yoke being provided with an operating handle and being arranged to embrace the type cylinder as a means for shifting the latter on the shaft.

8. In a check writer, the combination with a relatively fixed platen, of a shaft, a type cylinder mounted thereon and having a plurality of type forms disposed circumferentially thereof and spaced from each other longitudinally of the cylinder, the said cylinder being rotatable with the shaft but slidable freely longitudinally thereof, to bring the individual type forms, selectively, into coöperative position relatively to the platen, a yoke slidably mounted on the shaft to embrace the type cylinder as a means for shifting the latter, and provided with an operating handle and a guide separate from the shaft and engaged by a portion of the yoke for preventing rotation of the latter with the type cylinder and shaft.

9. In a check writer, the combination with a rotary type cylinder having a printing form thereon, a rotary platen normally occupying an inoperative position with reference thereto to permit the insertion of the check, and means for normally maintaining the cylinder with its form rotated to an inoperative position with reference to the printing point of contact with the platen, of means actuated with and dependent upon the rotation of the type cylinder for positively moving the platen into operative position relatively to the type cylinder upon each revolution of the latter as the form reaches the printing point.

10. In a check writer, the combination with a rotary type cylinder having a printing form thereon, a rotary platen geared to turn in positive relationship to the rotation of the cylinder and bodily movable toward and from the latter, said platen normally occupying an inoperative position with reference thereto to permit the insertion of a check and means for normally maintaining the cylinder with its form rotated to an inoperative position with reference to the printing point of contact with the platen, of means actuated with and dependent upon the rotation of the type cylinder for positively moving the platen into operative position relatively to the type cylinder upon each revolution of the latter as the form reaches the printing point.

11. In a check writer, the combination with a rotary type cylinder, a shaft therefor and a cam on the latter rotatable therewith, of a second shaft, a platen supported eccentrically thereon and normally occupying an inoperative position with reference to the type cylinder to permit the insertion of the check, and an arm fixed to the platen shaft and coöperating with the cam to rock said shaft and move the platen into operative position relatively to the type cylinder.

12. In a check writer, the combination with a rotary type cylinder having a printing form thereon, a platen normally occupying an inoperative position with reference to the path of movement of the form to permit the insertion of the check, and means for normally maintaining the cylinder with its form rotated to an inoperative position with reference to the printing point of contact with the platen, of means actuated with and dependent upon the rotation of the type cylinder at the start of its printing movement for positively moving the platen into operative position relatively to the type form upon each revolution of the cylinder as the form reaches the printing point.

13. In a check writer, the combination with a rotary type cylinder, and a platen normally occupying an inoperative position with reference thereto to permit the insertion of the check, of means actuated by the rotation of the type cylinder for moving the platen into operative position relatively to the type cylinder, said means also constituting a device for centering the type cylinder in its normal position.

14. In a check writer, the combination with a rotary type cylinder and a platen normally occupying an inoperative position with reference thereto to permit the insertion of the check, of a cam rotatable with the type cylinder, mechanism actuated by the cam at the start of the printing movement of the cylinder for moving the platen into operative position relatively to the cylinder and embodying a member coöperating with the cam and means for centering the type cylinder in its normal position comprising projecting and recessed portions on the cam and its said coöperating member, respectively.

15. In a check writer, the combination with a platen having a ribbed or serrated face, of a rotary type cylinder provided with circumferentially arranged type characters adapted for rolling contact with the face of the platen, the printing faces of which type characters are ribbed or serrated in a complementary manner to that of the contacting face of the platen.

16. In a check writer, the combination with a platen having a longitudinally ribbed or serrated face, of a rotary type cylinder provided with circumferentially arranged type characters adapted for rolling contact with the face of the platen, the printing face of which type characters are longitudinally or circumferentially ribbed or serrated in a complementary manner to the contacting face of the platen.

17. In a check writer, the combination with a rotary platen having a ribbed or serrated face, of a rotary type cylinder provided with circumferentially arranged type characters adapted for rolling contact with the face of the platen, the printing faces of which type characters are ribbed or serrated in a complementary manner to the contacting face of the platen.

18. In a check writer, the combination with a platen and a plurality of rotary type forms adapted for individual selective and successive coöperation therewith with a rolling contact in a direction longitudinally of the type form, of means for advancing the check a space between the impressions of successive forms.

19. In a check writer, the combination with a platen and a plurality of rotary type forms adapted for individual selective and successive coöperation therewith with a rolling contact in a direction longitudinally of the type form, said members being adapted to carry the check along between them, of devices on the members adapted to remain in coöperation to a predetermined degree after the printing impression has been completed to advance the check a spacing distance prior to the next succeeding impression.

20. In a check writer, the combination with a platen and a plurality of rotary type forms adapted for individual, selective and successive coöperation therewith with a rolling contact in a direction longitudinally of the type form, said members being adapted to carry the check along between them, of devices on one of the members adapted to remain in coöperation with the check to a predetermined degree after the printing impression has been completed to advance the check a spacing distance prior to the next succeeding impression.

21. In a check writer, the combination with a platen and a plurality of rotary type forms adapted for individual, selective and successive coöperation therewith with a rolling contact in a direction longitudinally of the type form, of means for advancing the check a space between the impressions of successive forms comprising intermeshing ribs on the platen and form, respectively, operating substantially in the manner set forth.

22. In a check writer, the combination with a bed, a platen and a type carrier having a type form thereon, said last mentioned members being arranged to coöperate intermittently and to advance the check between them during the impression interval, of a presser foot for holding the check against inadvertent movement on the bed but adapted to assume an inoperative position, the presser foot being under the control of one of said coöperating members to insure its operation as they move into coöperation with each other.

23. In a check writer, the combination with a bed, a platen and a type carrier having a type form thereon, said last mentioned members being arranged to coöperate intermittently and to advance the check between them during the impression interval, of a presser foot tending to normally hold the check against inadvertent movement on the bed, means for restraining the presser foot between the impression intervals to permit the insertion and withdrawal of the check, and means for automatically releasing the same as the form and platen move into coöperation.

24. In a check writer, the combination with a bed, a platen and a type carrier having a type form thereon, said last mentioned members being arranged to coöperate intermittently and to advance the check between them during the impression interval, of a presser foot tending to normally hold the check against inadvertent movement on the bed, means manually operable at the discretion of the operator for restraining the preser foot to admit of the insertion or withdrawal of a check and means for automatically releasing the same as the form and platen move into coöperation.

25. In a check writer, the combination with a bed, a platen and a rotary type cylinder having a type form thereon, said last mentioned members being arranged to coöperate intermittently and to advance the check between them during the impression interval, of a presser foot having a normal tendency to hold the check against inadvertent movement on the bed, a device for restraining the presser foot to permit of the insertion or withdrawal of a check between the impression intervals, said device comprising a detent, and a cam movable with the type cylinder and arranged to trip the detent as the type form moves into coöperation with the platen.

26. In a check writer, the combination with a printing couple adapted to advance the check during the impression interval, and a bed provided with a guide for one edge of the check, of a presser foot acting to press the check against the bed and embodying a roller turning in a plane convergent to the guide whereby the edge of the check is constantly urged against the guiding element.

27. In a check writer, the combination with a bed plate and an extensible slotted gage bar adapted to be projected from one side thereof when in operative position, of a spring pressed keeper plate having an elongated depressed portion fitting the slot in the gage bar and normally held yieldably therein and a guide pin extending through the slot and keeper, the gage bar being rotatable on the pin to displace the keeper and assume a folded position substantially parallel with the said side of the bed plate.

28. In a check writer, the combination with a printing bed support having a guide rod thereon, of an extension bed provided with a hook detachably engaging over the guide rod and slidable freely thereon to permit adjustments of the extension bed and a spring actuated jaw engaging the guide rod in opposition to the hook and forming a clamp jointly therewith.

29. In a check writer, the combination with a printing bed support having a pair of parallel offset guide rods thereon, of an extension bed provided with upper and lower hooks detachably engaging over the guide rods and slidable thereon to permit adjustments of the extension bed and a spring actuated jaw engaging the guide rod in opposition to one of the hooks and forming a clamp jointly therewith.

30. In a check writer, the combination with a printing couple and a check feeding bed, the direction of feed being parallel with the line of printing, of an alining finger overhanging the bed and beneath which the check is passed, said finger being provided with an angularly shaped sight opening for the purposes set forth, one portion of said opening being parallel with the direction of feed and the line of printing and the other portion being transverse thereto.

31. In a check writer, the combination with a platen, of a shaft, a type cylinder mounted thereon and having a plurality of type forms spaced from each other longitudinally of the cylinder, the said cylinder being rotatable with the shaft but slidable freely longitudinally thereof to bring the individual type forms, selectively, into coöperative position relatively to the platen, means for shifting the cylinder on the shaft and an inking device for the cylinder carried by the shifting means to move with the cylinder.

32. In a check writer, the combination with a platen, of a shaft, a type cylinder mounted thereon and having a plurality of type forms spaced from each other longitudinally of the cylinder, the said cylinder being rotatable with the shaft but slidable freely longitudinally thereof to bring, the individual type forms, selectively, into coöperative position relatively to the platen, a member slidable on the shaft but locked against rotation with the cylinder for shifting the latter longitudinally of the shaft and an inking device for the cylinder mounted on the shifting member to move with the cylinder.

33. In a check writer, the combination with a platen, of a shaft, a type cylinder mounted thereon and having a plurality of type forms spaced from each other longitudinally of the cylinder, the said cylinder being rotatable with the shaft but slidable freely longitudinally thereof to bring the individual type forms, selectively, into coöperative position relatively to the platen, a yoke sildably mounted on the shaft but locked against rotation therewith, said yoke being arranged to embrace the type cylinder as a means for shifting the latter on the shaft and an inking roll extending coincidently with the cylinder and carried by the yoke to yieldingly coöperate with and to move with the latter.

34. In a check writer, the combination with a casing, a platen within the casing, a shaft, a type cylinder mounted on the latter and having a plurality of type forms spaced from each other longitudinally of the cylinder, the said cylinder being driven by the shaft and shiftable longitudinally thereon to bring the individual type forms, selectively, into coöperative relationship with the platen at the printing point, means for shifting the cylinder, an indicator movable therewith and an index viewable from the exterior of the casing with which the indicator coöperates to show the particular type form that is at the printing point, the said casing being provided with an aperture in the vicinity of the printing point through which the forms are accessible for cleaning purposes.

35. In a check writer, the combination with a casing, a platen within the casing, a shaft, a type cylinder mounted on the latter and having a plurality of type forms spaced from each other longitudinally of the cylinder, the said cylinder, being driven by the shaft and shiftable longitudinally thereon to bring the individual type forms, selectively, into coöperative relationship with the platen at the printing point, means for shifting the cylinder, an inking roll for the latter carried therewith in fixed relationship and extending longitudinally thereof, an indicator movable with the cylinder and inking roll, and an index viewable from the exterior of the casing with which the indicator coöperates to show the particular type form that is at the printing point, the said casing being provided with an aperture in the vicinity of the printing point through which the inking roll is accessible for re-inking purposes.

36. In a check writer, the combination with a printing bed having an opening therein, of a printing couple arranged in operative relationship to the bed to coöperate through the opening therein and impress a check fed between them across the bed, the latter being provided with a depression in alinement with the printing couple for the purpose set forth.

37. In a check writer, the combination with a type carrier and a platen coöperating therewith, and adapted to receive a check between them, said members being movable relatively to make an impression, of means for applying ink to the type and means for embossing or raising a continuous rib on the face of the check, said rib constituting that portion of the check upon which the inked impression is made.

38. In a check writer, the combination with a type carrier and a platen coöperating therewith and adapted to receive a check between them, said members being movable relatively to make an impression, of means for applying ink to the type and means for embossing or raising a continuous rib on the face of the check by the movement of the members during the printing operation, said rib constituting that portion of the check upon which the inked impression is made.

39. In a check writer, the combination with a platen and a rotary type carrier coöperating therewith to progressively feed and print the check, of a slotted guard plate through which one of the members slightly projects to engage the other which guard closely surrounds the said member to permit only a narrow strip of the check to project therethrough during the printing operation whereby a continuous raised or embossed rib is formed up that bears the printed characters.

40. In a check writer, the combination with a platen, a rotary type carrier provided with a printing form and having a rolling contact with the platen to impress a check passing between said members and means on one of the latter for feeding or advancing the check a spacing distance at the end of the impression while the check is held in coöperation therewith by the other member, the platen being movable into and out of operative position with reference to the carrier and form, of means operating in timed relation to the type carrier for actuating the platen to inoperative position at a predetermined interval after the completion of the impression.

41. In a check writer, the combination with a platen, a rotary type cylinder provided with a plurality of circumferentially disposed printing forms arranged side by side longitudinally thereof for selective and successive coöperation with the platen by rolling contact to impress a check passing between said members, and means on one of the latter for feeding or advancing the check a spacing distance at the end of the impression while the check is held in coöperation therewith by the other member, the platen being movable into and out of operative position with reference to the cylinder and form, of means operating in timed relation to the type cylinder for actuating the platen to inoperative position at a predetermined interval after the completion of a given impression, the rear ends of all of the forms being in alinement with each other in a direction longitudinally of the cylinder.

42. In a check writing machine, the combination with a platen, of a type carrier having a plurality of printing surfaces of varying length adapted to coöperate, selectively, with the platen to print and feed the check longitudinally of said surfaces and means for automatically terminating the coöperation between the selected printing surface and the platen at the end of each printing operation irrespective of the length of the printing surface selected.

43. In a check writing machine, the combination with a platen, of a type carrier having a plurality of printing surfaces of varying length spaced longitudinally of the carrier and adapted to coöperate, selectively, with the platen to print and feed the check in a direction longitudinally of the surfaces and transversely of the carrier, the rear ends of all the printing surfaces being terminated in alinement with each other longitudinally of the carrier.

44. In a check writing machine, the combination with a platen, of a type carrier having a plurality of printing surfaces of varying length spaced longitudinally of the carrier and adapted to coöperate, selectively, with the platen to print and feed the check in a direction longitudinally of the surfaces and transversely of the carrier, the rear ends of all the printing surfaces being terminated in alinement with each other longitudinally of the carrier, and means for interrupting the coöperation of the platen and type carrier in timed relation to the progress of the common point of termination along the line of feed.

45. In a check writing machine, the combination with a platen, of a type carrier having a plurality of printing surfaces of varying length spaced longitudinally of the carrier and adapted to coöperate, selectively, with the platen to print and feed the check in a direction longitudinally of the surfaces and transversely of the carrier, the rear ends of all the printing surfaces being terminated in alinement with each other longitudinally of the carrier, and means for interrupting the coöperation of the platen and type carrier in timed relation to the progress of the common point of termination along the line of feed comprising mechanism under the control of the type carrier adapted to cause the retraction of the platen to an inoperative position at the end of the printing operation.

46. In a check writing machine, the combination with a platen, of a type carrier having a plurality of printing surfaces of varying length adapted to coöperate, selectively, with the platen to print and feed the check longitudinally of said surfaces and means whereby the check is given an additional feeding movement a determined distance slightly beyond that attained at the conclusion of the printing impression.

47. In a check writing machine, the combination with a platen, of a type carrier having a plurality of printing surfaces of varying length adapted to coöperate, selectively, with the platen to print and feed the check longitudinally of said surfaces, means whereby the check is given an additional feeding movement a determined distance slightly beyond that attained at the conclusion of the printing impression, and means for retarding excessive feeding movement of the check.

48. In a check writing machine, the combination with a platen, a type carrier having a plurality of printing surfaces of varying length adapted to coöperate, selectively, with the platen to print and feed the check longitudinally of said surfaces and means whereby the check is given an additional feeding movement a determined distance slightly beyond that attained at the conclusion of a printing impression from any selected surface, of means adapted to bear upon the check to control the feed imparted to it and to retard excessive feeding movement thereof.

49. In a check writing machine, the combination with a platen, and a type carrier having a shifting movement and a printing movement and provided with a plurality of forms each adapted to be selectively positioned for printing coöperation with the platen exclusively of the other forms through the shifting of the carrier, of an inking device comprising inking surfaces for the forms movable with the carrier during the shifting movement thereof to maintain a fixed inking relationship between each form and a corresponding inking surface.

50. In a check writing machine, the combination with a platen and a type carrier having a shifting movement and a printing movement and provided with a plurality of forms each adapted to be selectively positioned for printing coöperation with the platen exclusively of the other forms through the shifting of the carrier, said forms constituting two groups all the units of each of which it is desired to print in a contrasting color from the units of the other group, of an inking device comprising individual inking surfaces for each group of forms adapted to contain inks of different colors and movable with the carrier during the shifting movement thereof to maintain a fixed inking relationship between the forms and the corresponding inking surfaces and arranged in the path of the forms to ink the same when printing movement is imparted to the type carrier.

51. In a check writer, the combination with a casing, of a platen within the casing, a type carrier within the casing provided with a plurality of type forms and having a shifting movement adapted to bring the individual type forms, selectively, into coöperative relationship with the platen and also having a printing movement to impress and feed the check, a guide within the casing, and a shifting member slidable on the guide to shift the carrier during the selection of the type, said shifting member being provided with an operating arm extending outside of the casing to be accessible from the exterior thereof.

52. In a check writer, the combination with a casing, of a platen within the casing, a type carrier within the casing provided with a plurality of type forms and having a shifting movement adapted to bring the individual type forms, selectively, into coöperative relationship with the platen and also having a printing movement to impress and feed the check, an exteriorly arranged scale on the casing having graduations or characters indicative of the various individual forms, a guide within the casing, and a shifting member slidable on the guide to shift the carrier during the selection of the type, said shifting member being provided with an operating arm extending outside of the casing to be accessible from the exterior thereof and with an indicator coöperating with the scale.

53. In a check writer, the combination with a printing bed or table having an opening therein, a rock shaft arranged beneath the bed and a relatively offset platen carried by the shaft to swing toward and away from the opening in the bed, of a type carrier arranged above the bed and provided with a plurality of type forms, said carrier having a shifting movement adapted to bring the individual type forms, selectively, above the opening in the bed and into coöperative relationship with the platen and also having a printing movement to impress and feed the check, mechanism for actuating the type carrier to effect the said printing movement, and means operatively connecting the said actuating mechanism and the rock shaft for swinging the platen in timed relation to the printing and feeding movement of the type carrier.

54. In a check writer, the combination with a platen, of a shaft, a type cylinder thereon having a rotary movement and also adapted to slide longitudinally thereof, said cylinder being provided with a plurality of type forms adapted to be individually and selectively brought into coöperative relationship with the platen through one of said movements of the cylinder and to print and feed the check during the other movement thereof, an inking roller adapted to traverse the type forms with a rolling contact when the cylinder is rotated and means for shifting the inking roller in an axial direction longitudinally of the type cylinder shaft jointly with the aforesaid sliding movement of the type cylinder to maintain the positions of the latter and the inking roll, constant.

LIBANUS M. TODD.
CHARLES G. TIEFEL.

Witnesses:
SAYRE B. ROWE,
RUSSELL B. GRIFFITH.